May 8, 1962 E. AMMON 3,033,604
LIFTING AND TRANSPORTING DEVICE FOR HOLDING HOLLOW ARTICLES
Filed Jan. 26, 1960
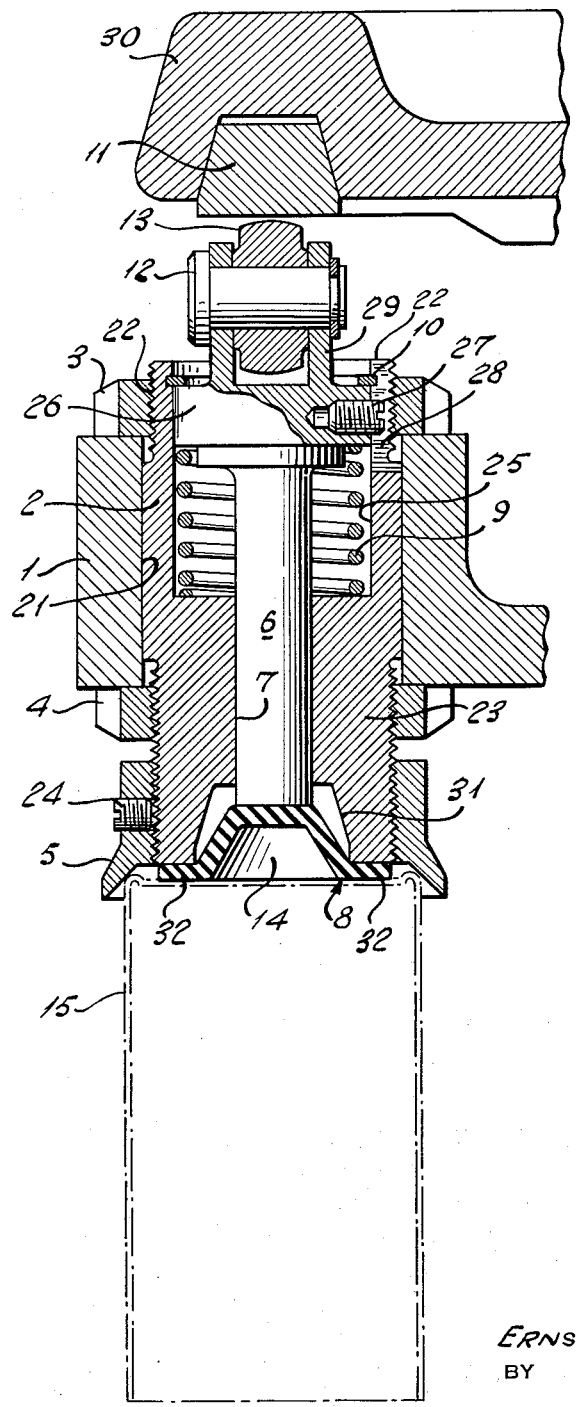
INVENTOR
ERNST AMMON
BY
ATTORNEYS

United States Patent Office 3,033,604
Patented May 8, 1962

3,033,604
LIFTING AND TRANSPORTING DEVICE FOR HOLDING HOLLOW ARTICLES
Ernst Ammon, Bern, Switzerland, assignor to Maschinenfabrik Winkler, Sallert & Co. AG, Bern, Switzerland
Filed Jan. 26, 1960, Ser. No. 4,743
Claims priority, application Switzerland Feb. 18, 1959
6 Claims. (Cl. 294—64)

This invention relates to devices for picking up hollow, preferably cylindrical hollow articles and holding same. Such devices are useful for feeding such hollow articles into machines for printing purposes and varnishing as it is, for example, the case in small, extruded containers.

In such machines for printing and varnishing hollow bodies have to be held in place by gripping or holding means for handling and printing. These holding means may comprise mechanical grippers, which require complicated mechanisms, such as linkages for operating the gripper fingers. Gripping devices having suction nozzles are also used which require extended pipe lines and vacuum hoses, and obviously, a vacuum pump.

Furthermore a pickup and holding device is known which consists of a piston cylinder which has on one end thereof a permanently attached centering plate and a suction nozzle having a bore, whereas the other end of said piston cylinder has a high precision bore at close tolerance, in which bore a piston equipped with piston rings is arranged which piston is reciprocated by means of a spring and a controlled cam or roller. The precise and therefore expensive machining of this bore in the piston cylinder which is subject to considerable wear is of prime importance.

It is one of the objects of this invention to provide means simplifying such pick-up and holding device and simultaneously reducing the manufacturing cost thereof.

It is another object of this invention to provide means conducive to new and improved means for picking up and for holding hollow articles.

Still another object of this invention is to provide means affording centering of the picked-up articles and for holding them in centered position.

Furthermore it is an object of the present invention to provide means leading to an efficacious, easily operable and sturdy gripping construction for the intended purposes.

Further objects and advantages of the invention will be set forth in part hereafter and in part will be obvious therefrom or may be learned by practicing the invention, the same being realized and attained by means of the instrumentalities and combinations pointed out in the appended claims.

Referring now more specifically to the drawing, in which parts will be identified by specific terms for convenience, but such terms are intended to be as generic in their application to similar parts as the art will permit. Like reference characters denote like parts in the drawing, wherein a disc or support 1, partly broken away, is illustrated, which has a plurality of vertical bores 21 spaced apart near the periphery thereof. The disc is adapted to be rotated about a central axis or to be revolved around a central portion of the apparatus (not shown) in a well known manner. In each one of these bores 21 is disposed a piston cylinder 2 which is threaded on its upper portion 22 and on its lower portion 23 and which is held firmly in place in its bore 21 by nuts 3 and 4, respectively.

On the lower portion of the cylinder 2 is a centering disc 5 threadedly engaged, which can be adjusted upwardly and downwardly and which is secured in its position by a setscrew 24. The cylinder 2 has a central smaller bore 7 in its lower portion and a wider bore 25 in its upper portion. A piston generally designated 6 is fitted in the lower, smaller bore 7, said piston having an extension head portion 26 of larger diameter which is slidably fitted in the upper, wider bore 25.

On the piston or extension head 26 is a pilot screw 27 which fits in corresponding slot 28 formed at one segmental portion in the wall of the upper portion 22 in order to prevent rotation of the piston 6, 26. In the wider bore 25 a spring 9 is located, abutting against the underside of the piston or extension head 26 and circumpositioned about piston 6 for urging said head 26 together with piston 6 upwardly against a snap ring 10. The piston head 26 carries on its upper side a fork 29 in which a cam follower or roller 13 is rotatably arranged by means of a pin or shaft 12. The cam follower or roller 13 is moved along the face of a cam piece 11 located or recessed in frame 30 (partly broken away) for effecting a downward stroke of the piston head 26 and piston 6.

On the lower end of the piston 6 a cup 8 made of a flexible, rubber-like material provided with a cavity 14 in its center portion, is firmly attached, and a cavity 31 in the lower portion 23 of the piston cylinder 2 is provided so that the flanges 32 of said cup 8 may rest on the face of the lower portion 23 of the piston cylinder 2 while the center portion of said cup 8 is retracted into said cavity 31 when the piston assembly is urged into its uppermost position by the spring 9, thus increasing the cavity 14 in said cup 8.

The device is operated by the rotation of the disc 1, whereby the cam follower or roller 13 along the path of the cam 11, is depressed. Hereby the piston head 26 is moved downwardly, compressing the spring 9. The piston 6, forming part of the piston head 26, with the rubber cup 8 on its lower face is moved downwardly on top of the hollow article 15 to be picked up. When the flanges 32 of said cup come to a rest on top of the hollow article 15, the cup 8 is still further compressed so that the cavity 14 becomes smaller. On the return movement operated by the spring 9, a vacuum in the cavity 14 is generated by pulling or at least partly moving the cup into the recess 31 and thus increasing said cavity 14 of said cup 8, and the hollow article 15 is picked up, centering itself relative to the centering disc 5 for further processing, such as printing or transferring etc.

When upon further rotation of the rotating disc 1 the cam follower or roller 13 again is moved downwardly by the cam 11, piston 6 depresses the cup, thus breaking the vacuum previously created in the cavity 14 and causing release of the hollow article 15.

While the invention has been described and illustrated with respect to a certain particular preferred example which gives satisfactory results it will be understood by those skilled in the art after understanding the principle of the invention, that various other changes and modifications may be made without departing from the spirit and scope of the invention and it is intended therefore in the appended claims to cover all such changes and modifications.

I claim:

1. Pick-up and holding device for hollow articles comprising a movable disc, at least one elongated piston cylinder fixedly held on said disc, said piston cylinder having a central bore, a recess having a substantially larger diameter than said bore on one end of said elongated cylinder, a piston having a head, said piston being slidably arranged in said bore, said piston having a cup made of a flexible material firmly secured to the end opposite the said head thereof, said cup having a cavity in its center portion and a flange surrounding said cavity disposed over the end of said piston cylinder, a spring abutting against said head of said piston urging said piston upwardly and a cam follower mounted on top of said head in a manner to cause movement of said piston when said cam follower is depressed, said piston being effective on downward movement to compress said cup-shaped member to diminish the vacuum space above the article held thereby to release the article and being effective to increase the vacuum space to hold an article upon upward movement after said cup-shaped member is positioned on the article.

2. Pick-up and holding device for hollow articles according to claim 1, and comprising a centering disc for said hollow articles extending downwardly from the end of said elongated piston cylinder adjacent said cup.

3. Pick-up and holding device for hollow articles according to claim 2 including means connecting said centering disc to said piston cylinder permitting relative adjustment therebetween.

4. Pick-up and holding device for hollow articles comprising a rotating disc, elongated piston cylinder means attached to said disc, each one of said piston cylinders having a central bore, a piston means slidably arranged in said bore, said piston means having a head on one end and cup means made of flexible material on the other end thereof, said cup means having a cavity and a flange surrounding said cavity disposed over the end of said cylinder, spring means abutting against said head and a cam follower or roller mounted on said head in a manner to cause movement of said piston when said cam follower is depressed, and centering means for said hollow articles extending downwardly from the end of said elongated piston cylinder adjacent said cup, said piston being effective on downward movement to compress said cup-shaped member to diminish the vacuum space above the article held thereby to release the article and being effective to increase the vacuum space to hold an article upon upward movement after said cup-shaped member is positioned on the article.

5. A pick-up and holding device for cams and similar articles comprising a circular cam, a cylinder mounted for rotation in an arc adjacent said cam, said cylinder having a hollow central bore and a recess of larger diameter defined in its lower face, a resilient substantially cup-shaped member having a central portion and an outer flange portion disposed across the recess, a piston slidable in said bore and connected at one end to the central portion of said cup-shaped member and having means at the opposite end engageable with said cam, and means to bias said piston into contact with said cam whereby said piston is reciprocated under the influence of said cam upon rotation of said cylinder, said piston being effective on downward movement to compress said cup-shaped member to diminish the vacuum space above the article held thereby to release the article and being effective to increase the vacuum space to hold an article upon upward movement after said cup-shaped member is positioned over the article.

6. A pick-up and holding device according to claim 5, wherein said cylinder is threaded at each end and a locking nut threaded onto said cylinder at each end to hold it to its mounting.

References Cited in the file of this patent

UNITED STATES PATENTS

| | | |
|---|---|---|
| 1,006,315 | Toth | Oct. 17, 1911 |
| 1,487,414 | Weatherhead | Mar. 18, 1924 |
| 2,193,097 | Hildebrand | Mar. 12, 1940 |
| 2,607,620 | Oliveri | Aug. 19, 1952 |
| 2,620,217 | Lenhart | Dec. 2, 1952 |
| 2,951,716 | Myers | Sept. 6, 1960 |